April 16, 1957
E. R. DYE ET AL
2,789,198
SOLDERING GUN
Filed Sept. 29, 1955
2 Sheets-Sheet 2
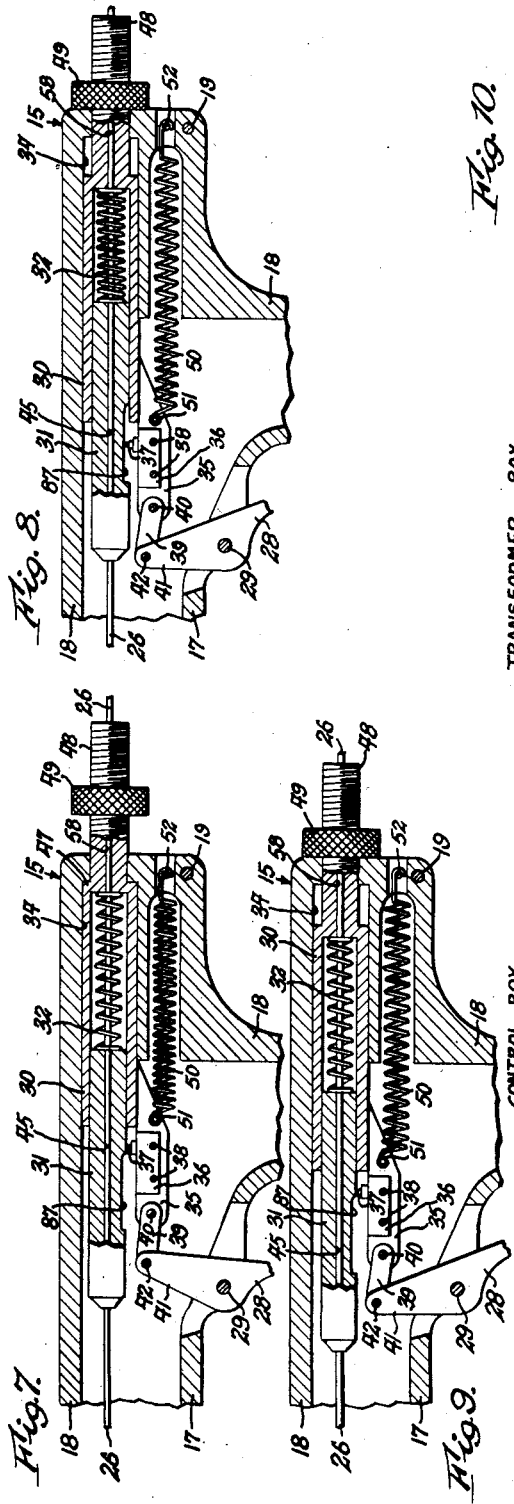
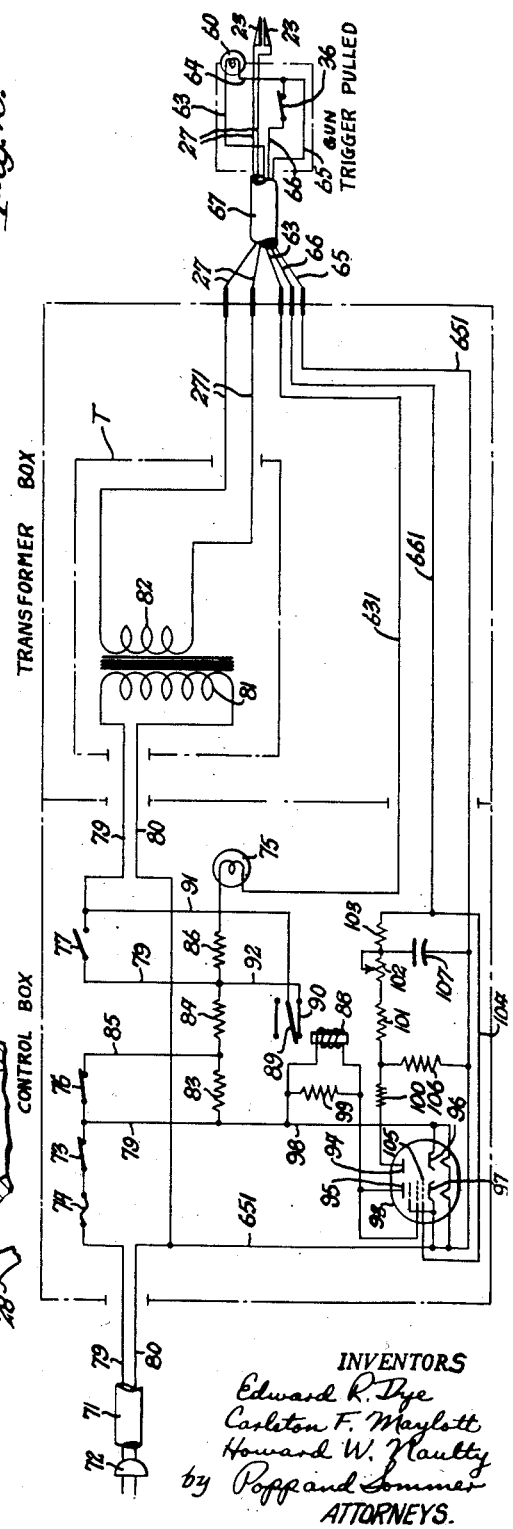
INVENTORS
Edward R. Dye
Carleton F. Maylott
Howard W. Naulty
by Popp and Sommer
ATTORNEYS.

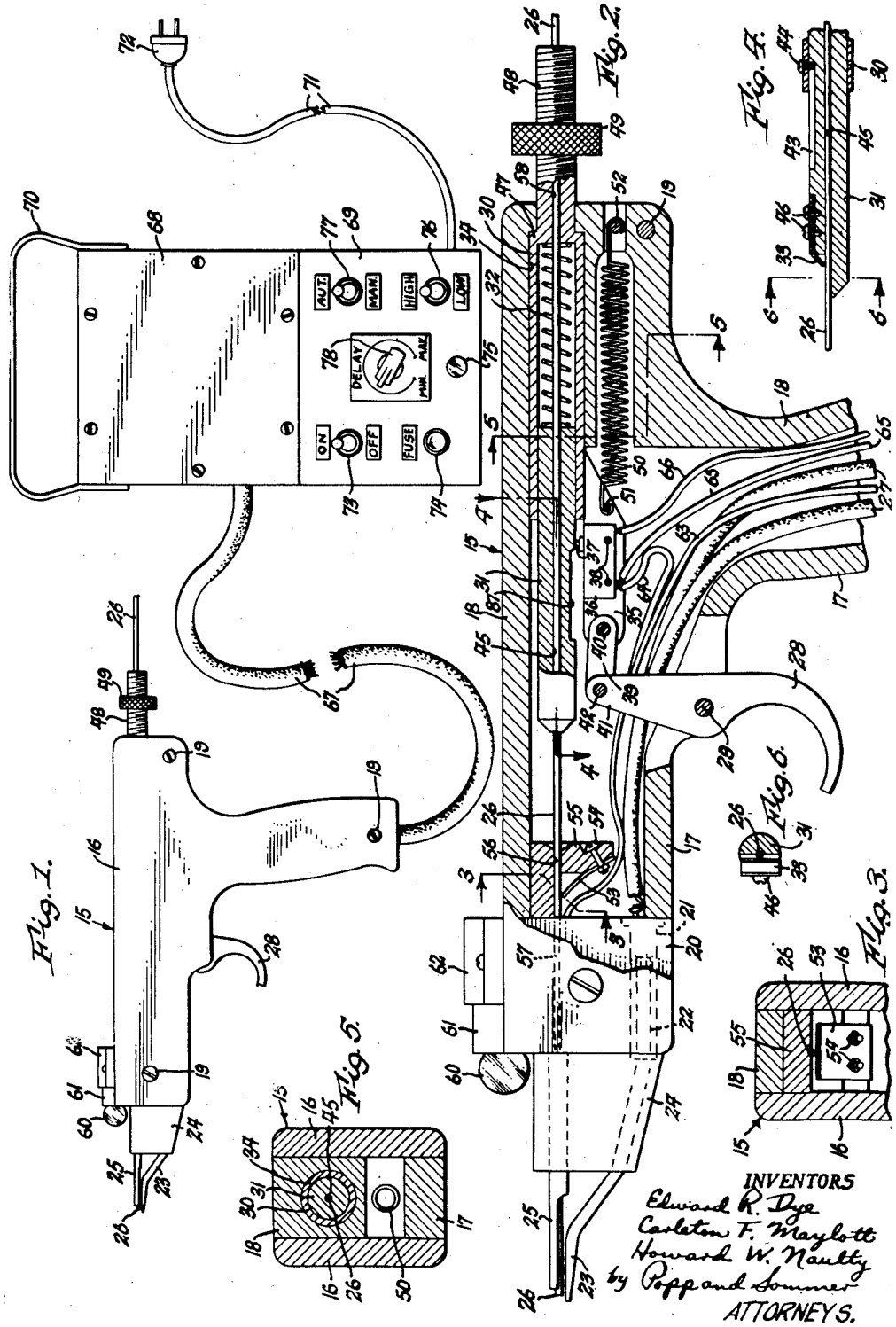

United States Patent Office 2,789,198  
Patented Apr. 16, 1957

2,789,198

SOLDERING GUN

Edward R. Dye, Orchard Park, Howard W. Naulty, East Aurora, and Carleton F. Maylott, Williamsville, N. Y., assignors to Cornell Aeronautical Laboratory, Inc., Buffalo, N. Y., a corporation of New York Application September 29, 1955, Serial No. 537,478

12 Claims. (Cl. 219—27)

This invention relates to improvements in soldering guns and particularly to those of the electrical resistance type which are characterized by having a pair of conductive soldering tips adapted to make contact with the work to be soldered so as to permit a large alternating current to pass through the work and heat it by virtue of its resistance and the resistance of the contacts and the tips, the hot work melting a length of solder wire which is fed toward the work. The heating of the work by its own electrical resistance results in a joint which is free of voids and is electrically perfect.

One of the primary objects of the present invention is to improve the means for feeding the solder wire to the work site. In prior soldering guns, as exemplified by the disclosure of United States Patent No. 2,604,571, the rate and force of the feed of the solder wire were directly dependent upon the gun trigger actuation, that is, the harder the trigger was pulled the greater the load with which the solder wire was forced against the work. Likewise, repetitive partial manipulations of the trigger could feed an undetermined amount of solder wire, thereby frequently resulting in too little or too great an amount of solder melted. These disadvantages are overcome by the present invention by providing means for feeding a predetermined length of solder wire automatically with a predetermined force thereby precluding many difficulties due to operator inexperience.

Another object is to provide such an improved feeding means in which the length of solder wire fed can be readily adjusted so that the gun can be used on different jobs where more or less solder is required.

Another important object is to provide a resistance type soldering gun with an electrical control which keeps the soldering tips energized for a predetermined period of time after the feed of solder has stopped so as to assure a smooth, saturated soldered joint.

A further important object is to provide such a resistance type soldering gun in which the electrical control energizes the soldering tips only when solder is urged toward the work even though the soldering tips have been in initial contact with the work.

Another object is to provide means which signal the operator of the gun when the soldering period has begun and also when it has ended.

The general objective of the present invention is to improve the art of soldering by contributing a soldering gun with electrical control which provides fast soldering, automatic solder feed, automatic heating of the work, and a resulting high quality soldered joint.

Other objects and advantages will be apparent from the following detailed description and accompanying drawings in which:

Fig. 1 is an elevational side view of a soldering gun and its associated electrical control apparatus, all constructed in accordance with the present invention.

Fig. 2 is an enlarged fragmentary vertical sectional view of the soldering gun shown in Fig. 1.

Fig. 3 is a fragmentary transverse vertical sectional view thereof taken on line 3—3, Fig. 2.

Fig. 4 is a fragmentary horizontal sectional view thereof taken on line 4—4, Fig. 2.

Fig. 5 is a transverse vertical sectional view thereof taken on line 5—5, Fig. 2.

Fig. 6 is a transverse vertical sectional view of the movable solder clamping means shown in Fig. 4, this view being taken on line 6—6 thereof.

Fig. 7 is a view similar to Fig. 2 but showing, on a reduced scale, only the right half portion of the gun with the various wires removed to illustrate better the solder wire feed mechanism prior to actuation thereof.

Fig. 8 is a view similar to Fig. 7 but showing the condition of the feed mechanism after actuation and during an intermediate stage of solder feed.

Fig. 9 is a view similar to Figs. 7 and 8 but showing the condition of the feed mechanism at the end of the solder feed.

Fig. 10 is a wiring diagram of the preferred electrical control circuit for the gun.

The soldering gun is shown as having a hollow body 15 formed to provide a horizontally elongated upper portion and a grip or handle portion depending therefrom intermediate the ends thereof. While the body 15 may be constructed in any desired manner and of any suitable material, it is shown as fabricated of plastic pieces including a pair of suitably contoured side plates 16—16, a combined bottom and front end wall 17 and a combined top and rear end wall 18. The end walls 17 and 18 are arranged between the side plates 16 and the assembled body is held together by several screws 19.

A block 20 of insulating material is shown as arranged between the front upper ends of the side plates 16. This block 20 adjacent its bottom houses a pair of transversely spaced metal sockets 21 which are adapted to receive the prongs 22 of a pair of soldering tips 23. These tips 23 are shown as having their rear portions embedded in a block of ceramic material 24 in which is also embedded a guide tube 25. This guide tube 25 projects forwardly from the ceramic block and is for the purpose of guiding a solder wire 26 to the free ends of the tips 23. Adjacent its free end the bottom portion of the guide tube 25 is shown as cut out so as to hood the solder wire. The sockets 21 are severally connected by wires 27—27 leading from a source of current as hereinafter described. It will be seen that the tips 23, ceramic block 24 and guide tube provide a unitary structure which is removably mounted on the gun body. This is desirable to permit interchange with other tips of different configuration, although the removable tip feature forms no part of the present invention, but is described to indicate the flexibility and adaptability of the gun to a wide variety of soldering jobs.

Means are provided for feeding the solder wire forwardly toward the tips 23 automatically with a predetermined force initiated by the actuation of a trigger 28. The trigger 28 is shown as pivotally mounted on the gun body 15 by a transverse pivot pin 29 and is so arranged forward of the grip portion of the body and formed as to be conveniently engaged by the forefinger of the operator while gripping the gun. Such feed means comprise a movable cylinder 30 linked to the trigger, a piston 31 arranged within the cylinder, a feed spring 32 interposed therebetween, and a spring clamp 33 on the piston for engagement with the solder wire 26.

The cylinder 30 is shown as an elongated cup-shaped member, open at its front end and closed at its rear end, and arranged horizontally at the rear of the upper portion of the gun body 15 with its axis in horizontal alinement with that of the guide tube 25. The gun body is suitably formed to provide a cylindrical bore 34 in which the cylinder 30 is axially slidable. Adjacent its front end the cylinder 30 has a pair of transversely spaced downwardly and forwardly projecting arms 35—35 between which a micro-switch 36 having an upstanding plunger 37 is arranged. This micro-switch is shown as mounted on the arms 35 by a pair of transversely extending screws 38—38. The front ends of the arms 35 are connected by a pair of links 39—39, arranged between these arms and pivotally connected thereto by the transverse pivot pin 40, to the upper end of the lever arm 41 of the trigger 28. The front ends of the links 39 straddle the lever arm 41 and are pivotally connected thereto by the transverse pivot pin 42. It will thus be seen that when the trigger is pulled rearwardly the cylinder 30 will move forwardly.

The piston 31 is shown as an elongated cylindrical member having its rear portion slidably arranged within the bore of the cylinder 30 and its front portion projecting forwardly therefrom. To keep the piston 31 from turning relative to the cylinder 30, the piston along one side is provided with an elongated horizontal groove 43 into which projects the end of a pin 44 carried by the wall of the cylinder as shown in Fig. 4. The piston 31 is also shown as provided with a central hole 45 which extends axially therethrough. The solder wire 26 extends through this hole. One half of the front end portion of the piston 31 is removed as shown in Fig. 4 so that the spring clamp 33 can engage the solder wire 26. The spring clamp 33 is shown as a thin plate attached to the piston 31 by the screws 46—46 and having a front end portion inturned at an angle so that the inner transverse edge thereof resiliently engages the side of the solder wire 26. This arrangement permits the spring clamp 33 to hold the solder wire to the piston 31 as the latter is moved forward thereby also moving the solder wire forwardly, but permits the piston to move rearwardly from an advanced position without moving the solder wire rearwardly. Thus a one-way movable clamp is provided.

The piston 31 is urged forwardly relative to the cylinder 30 by the spring 32 which is shown as a helical spring arranged within the cylinder and interposed between the rear end wall 47 thereof and the rear end of the piston. The spring 32 is always in a state of compression and when the trigger 28 is not actuated engagement of the pin 44 with the rear end wall of the groove 43, as shown in Fig. 4, limits the extent of projection of the piston 31 from the cylinder 30.

The extent of forward movement of the cylinder 30 determines the length of solder wire fed. Such forward movement is adjustably controlled by means which are shown as including an externally threaded stem 48 projecting rearwardly through a hole in the gun body and a thumb nut 49 adjustably arranged on this stem. The stem 48 is shown as integrally connected to and projecting rearwardly and axially from the end wall 47 of the cylinder 30. This stem 48 has a central hole 58 extending axially therethrough for the solder wire 26. The cylinder 30 can be moved forwardly until the front face of the nut 49 abuts the rear face of the gun body and since this nut is axially adjustable on the stem 48 merely by turning it one way or the other, it will be seen that the length of solder wire fed can be readily increased or decreased. The periphery of the nut 49 is preferably cylindrical and knurled for easy turning.

When the trigger 28 is released the cylinder 30 will return to its most rearward position in which the end wall 47 of the cylinder abuts the inner face of the end wall 18 of the gun body as shown in Figs. 2 and 7. This is accomplished by a return spring 50 arranged below the cylinder 30 and hooked at its front end to a transverse pin 51 carried by the arms 35 and hooked at its rear end to an anchor pin 52 mounted on the end wall 18 of the gun body.

During retraction of the solder wire feed mechanism the solder wire is held stationary to prevent its retrograde movement. This is shown as accomplished by a second clamp spring 53 stationarily arranged on the gun body. This clamp spring 53 is a thin sheet or leaf of springy metal mounted adjacent one end, as by the bolts and nuts 54—54, to the lower end of the depending leg of an L-shaped bracket 55 arranged on the rear side of the insulating block 20. The clamp spring 53 extends upwardly and forwardly from its mounting so that its free end is directed toward the flat undersurface of the upper part of the bracket 55. The bracket 55 has a hole 56 therein which alines with the longitudinal hole 45 in the piston 31 and also with the guide tube 25 in the ceramic block 24. The hole 56 extends through the bracket 55 at the place of juncture between its upper part and leg so that along the lower surface of such upper part the hole continues as a semi-cylindrical inverted groove, as best shown in Fig. 3. The solder wire 26 extends through the hole 56 and is pressed against the grooved portion thereof by the upper transverse edge of the clamp spring 53. The insulating block 20 is also provided with a horizontal hole 57 therethrough in alinement with the hole 56 and the guide tube 25. It will be seen that this arrangement permits the solder wire 26 to be moved forwardly through the alined holes 56 and 57 and guide tube 25, the solder wire slipping over the upper edge of the clamp spring 53. However, this edge of the clamp spring 53 will prevent rearward movement of the solder wire 26.

The soldering gun has a pilot light 60 which illuminates the work site, changes from bright to dim to signal the beginning of the soldering, and changes from dim to bright to signal the end of the solding operation. This pilot light 60 may be mounted on the gun as desired but is shown as mounted on the top of the gun at the front thereof adjacent the insulating block 20. The bulb is preferably removably mounted in a socket 61 of the bayonet slot type in turn held to the gun body 15 by a strap 62 secured thereto.

Current is supplied to the pilot light by wires 63 and 64, the latter of which is connected to a terminal on the micro-switch 36. Another wire 65 is connected to said terminal and still another wire 66 is connected to the other terminal of the micro-switch 36. These wires 65 and 66 along with the two wires 27 and wire 63 extend out a hole in the butt end of the grip portion of the gun as a five-conductor cable 67. This cable 67 has a suitable length and at its outer end is provided with a plug adapted to be removably connected to a receptacle on a transformer box 68. While the plug and receptacle are not shown in Fig. 1, they are diagrammatically suggested in the wiring diagram, Fig. 10. The transformer box 68 is shown as mounted on a control box 69 to provide a unit having a handle 70 for easy carrying. A two conductor power supply line 71 of sufficient length leads from the control box 69 and has a plug 72 at its outer end adapted to be inserted in a live receptacle. It will thus be seen that the soldering gun with its combined transformer and control box and associated lines is a transportable assembly.

The control box 69 contains an on-off switch 73, a fuse 74, a pilot light 75, a high-low switch 76, an automatic-manual switch 77, and a time delay control knob 78. The pilot light 75 and the one on the gun, the pilot light 60, are illuminated, when the power plug 72 is inserted in a live receptacle and the gun is connected to the transformer box 68, if the on-off switch 73 is turned "on." Dark pilot lights under these conditions indicate either a blown fuse or a burned-out pilot light. Both pilot lights are connected in series.

The "automatic" position of the switch 77 makes the soldering gun fully automatic in operation. As soon as the trigger 28 is pulled, heat and solder are applied to the work and events thereafter occur and are timed automatically. After a predetermined length of solder wire has run out and a predetermined length of time thereafter has elapsed, the current stops. The "manual" position of this switch 77 disables or renders inoperative the automatic timing control. During "manual" use of the gun, the only function of the trigger 28 is to feed solder to the work; timing, as with other guns and soldering irons, is entirely at the discretion of the operator.

When the high-low switch 76 is in the "high" position, high current and heat are obtained. When this switch is in "low" position, low current and heat are obtained. The same is true regardless of the position of the automatic-manual switch 77. In general, "high" and "low" positions are used with large and small masses of work, respectively. Thus the soldering time is not necessarily different. The values of secondary current which correspond to the two switch positions should be selected with care as to the limitations of circuit components and variations in work encountered in typical applications of the gun.

When the solder wire stops feeding out automatically, or the trigger is released, a certain amount of molten solder has coated or filled a hot joint, but the joint is not fully saturated with solder. Experience has shown that the solder flows smoothly around the work when heating is continued for about 1 to 5 seconds after the initial melting time. The required "delay" time depends upon the type of work, the rate of heating ("high" or "low"), and the length of solder wire fed to the work at each pull of the trigger. Inadequate delay time produces a rough-appearing but usually satisfactory joint. Excessive delay time introduces unnecessary heat into the joint, which may burn insulation adjacent the joint. A proper delay time is obtainable by rotation of the delay control knob 78. This knob, in rotating clockwise from "min." to "max." position, provides a continuous adjustment of delay time ranging from about 1 to 5 seconds. The optimum setting of this knob must be determined largely by experience until some judgment has been acquired, but, once set, the knob, like the three switches 73, 76 and 77, may be disregarded in repetitive soldering operations. When either the proper delay time or the proper amount of solder is unknown and operations are non-repetitive, "manual" operation may be advantageous. Then heating continues as long as the gun is held against the work, and any quantity of solder may be obtained by successive full or partial strokes of the trigger 28. With the gun set for "manual" operation, it can also be used advantageously for melting existing soldered joints, to clean terminals and wire ends, or to resolder old joints.

Turning now to a detailed explanation of the circuit shown in Fig. 10 to accomplish the foregoing, it will be seen that the power plug 72 is connected to the two lines 79 and 80 which constitute the power supply line 71 shown in Fig. 1. A transformer T having a primary winding 81 is connected to the lines 79 and 80. The secondary winding 82 of this transformer is connected by the lines 271—271 with the lines 27, 27 which lead to the soldering tips 23. The fuse 74, on-off switch 73, a high resistor 83, a low resistor 84, and the automatic-manual switch 77 are shown as arranged in the line 79. By means of a branch line 85 including the high-low switch 76, the high resistor 83 can be shunted out in the primary circuit. Thus when the switch 76 is closed as shown current will pass only through the low resistor 84 and produce a higher heat at the soldering tips than when the switch 76 is open which requires the primary current to pass through both resistors 83 and 84 and produce a lower secondary current.

The two pilot lights 60 and 75 and a current limiting resistor 86 are connected in series by the lines 63 and 631 to the transformer side of the heat control resistor 84 and by the lines 64, 65 and 651 to the common or return wire 80 of the A.-C. line. Since the voltage applied to the pilot lights decreases when the transformer draws load current, by reason of the voltage drop in the heat control resistor (84 or 83 plus 84), the pilot lights dim when the heat is on, as desired. Obviously, the pilot lights are dimmer on "low" heat (switch 76 open) than on "high" heat (switch 76 closed).

The heart of the automatic timing circuit to be described is the micro-switch 36 arranged within the gun body 15 immediately below the piston 31. The switch is normally open but its contacts close when the trigger 28 is pulled and reopen when a selected length of the solder wire 26 has fully advanced. Actuation of the switch 36 is controlled by a cam surface 87 recessed in the bottom of the piston 31 and which engages the plunger 37 of this switch.

When the contacts of the micro-switch 36 close (as shown in Fig. 10), a heat-control relay 88 is energized instantly by an electronic circuit, but, when the micro-switch contacts open, this relay is not de-energized until a certain time has elapsed. The relay 88 is shown as having a movable contact 89 and a fixed contact 90. The movable contact 89 is connected by the branch line 91 to the power line 79 on the transformer side of the automatic-manual switch 77. The fixed contact 90 is connected by the branch line 92 to the power line 79 between the heat-control resistor 84 and the automatic-manual switch 77. When the relay 88 is energized its contacts 89 and 90 close (as shown in Fig. 10) and connect the power line to the soldering transformer through the heat-control resistor 84 or resistors 83 and 84, thus applying secondary voltage to the soldering tips 23. When the relay 88 is de-energized, its contacts 89 and 90 open and cut off the heating current, unless the automatic-manual switch 77 is in "manual" position (closed), in which case the relay contacts are by-passed by closed contacts so that heating current continues to flow.

The time delay circuit is shown as including a line-voltage heater type of diode-pentode vacuum tube 93 having two plates 94, 95, and two cathodes 96 and 97 with heating filaments arranged in series between the return line 651 and a branch line 98, the latter being connected to the power line 79 between the on-off switch 73 and the heat-control resistor 83. The winding of the relay 88 connects the plate 95 of the pentode part of the tube 93 to the branch line 98 and a resistor 99 is shown as shunted across the relay winding.

The plate 94 of the diode part of the tube 93 is shown as connected with the line 661, which is an extension of the line 66 leading from one terminal of the micro-switch 36, through a fixed resistor 100, a second fixed resistor 101, a variable resistor 102 and a third fixed resistor 103, all arranged in series. A branch line 104 connects the control grid 105 of the pentode part to the line 661 on the gun side of the resistor 103. A fixed resistor 106 connects the line 661 between the resistors 100 and 101 with the return line 651. A time-delay condenser 107 connects the movable contact of the variable resistor 102, which is controlled by the knob 78, with the return line 651.

The diode part of the tube 93 serves as a half-wave rectifier to charge the time-delay condenser 107 slowly through a resistance voltage divider, consisting of the fixed resistors 100 and 106, and the fixed and variable resistors 101 and 102 respectively. Negative voltage from the condenser 107 is applied to the control grid 105 of the triode-connected pentode part of the tube 93 when it is necessary to cut off plate current (95) and thus de-energize the relay 88 and soldering tips 23. This negative voltage builds up soon after a short circuit across the condenser 107 has been removed. The build-up time is governed by the time constant of the condenser 107 and charging resistors 100, 101 and 102. The short circuit is applied by closing the contacts of the micro-switch 36 in the gun, and starts when the trigger 28 is pulled, continuing until the solder wire 26 has fully advanced as shown in Fig. 9. In order to avoid high peak currents and possible welding of the micro-switch contacts when they are closed across the charged condenser 107 the current-limiting resistor 103 is used. Its resistance is very small, as compared with that of the resistors 101 and 102, and thus the condenser is effectively short circuited through the resistor 103.

The plate current (95) which operates the heat control relay 88 is self-rectified A.-C. or pulsating D.-C., and would cause hum or malformation of the relay, which is a D.-C. type, unless some means were provided to minimize the A.-C. component. Usually a bypass condenser is used for the purpose, but here disclosed is the resistor 99 which is shunted across the relay winding to carry most of the alternating current. The resistor is much cheaper and smaller than an equivalent condenser, but it bypasses about half of the D.-C. component of the plate current, as its normal resistance is comparable with that of the relay.

During "manual" operation, the contacts of the automatic-manual switch 77 are closed across the relay contacts 89 and 90 which then may open or close without effect. The transformer T remains connected to the power lines 79 and 80 through the one resistor 84 or both resistors 83 and 84, depending upon the setting of the high-low switch 76, but the time delay circuit goes through the usual automatic cycle. Pulling the trigger 28 energizes the relay 88, closing its contacts 89 and 90; the solder melts, opening the micro-switch 36; and later electronic events release the relay, opening its contacts.

Instead of the electronic time delay circuit shown and preferred, any other suitable type of electrical circuit may be employed as long as it produces the desired time delay in deenergizing the tips after the solder wire feed stops.

*Automatic operation*

The soldering gun is adapted for use with random lengths of resin-cored solder wire. One such length 26 is shown as arranged in the gun and was inserted thereinto from the rear through the alined holes 58, 45, 56 and 57 emerging at the front of the gun through the guide tube 25.

Solder wire should be even with the ends of the soldering tips 23 at the beginning of each soldering operation. Any solder wire which projects beyond the tips should be cut off, just inside the tips, so that the tips will make good contact with the work. Another method of alining the solder wire is to pull it out from the tips, reinsert it at the rear end of the gun, and feed it towards the tips by successive strokes of the trigger 28. The last stroke may be a partial stroke. The solder wire feed mechanism is not reversible. Solder wire may be advanced manually or by trigger action, but cannot be pushed back.

The power plug 72 is then inserted in a receptacle (115±5 volts A.-C., 60 cycles). The switches 73, 77 and 76 should read respectively "on," "automatic," and "high" or "low" as required by the size and speed of work. Both pilot lights 60 and 75 should be bright. The delay control knob 78 should be in mid-position unless or until a better position is known by trial. The soldering gun is now fully automatic. It is only necessary to press the soldering tips 23 against the work and pull the trigger 28. The trigger-operated mechanism spring-loads the solder wire 26 against the work and closes the contacts of the micro-switch 36.

The operation of the solder wire feed mechanism is illustrated in Figs. 7-9. In Fig. 7, the trigger is about to be pulled. In Fig. 8, the trigger has been pulled until the thumb nut 49 abuts the gun body thereby moving the cylinder 30 forwardly over the piston 31 which initially remains stationary and compressing the spring 32. As the solder wire 26 melts at its front end the spring 32 expands and advances the piston 31 to which the solder wire is clamped by the spring clamp 33, thereby advancing the solder wire toward the work. With the trigger 28 held pulled, the piston 31 advances until the pin and slot connection 43, 44 (Fig. 4) limits the forward movement of the piston relative to the cylinder 30 as shown in Fig. 9. Following this the trigger 28 may be released to return the feed mechanism, under the action of the stretched return spring 50, to the condition shown in Fig. 7. The stationary spring clamp 53 holds the solder wire 26 while the movable spring clamp 33 returns to its starting position.

It is to be noted that the micro-switch 36 moves with the cylinder 30 and because of the engagement between the switch plunger 37 and the cam surface 87, this switch, initially open, is closed and then reopened as the piston 31 moves relative to the cylinder 30 through the stages depicted in Figs. 7-9.

As noted above, the solder wire 26, by striking the work, which is an obstacle in its path, is restrained from moving until it melts. Simultaneously, the tips 23 are energized by closing the contacts of the micro-switch 36, and if the tips make good electrical contact with the work, a large current flows and the pilot light 60 dims, indicating the heat is on. If this pilot light remains bright, the contact is faulty, due to inadequate pressure, poor positioning of the tips, or insulating matter under either tip. Guided by changes in light intensity, the operator learns quickly how to maintain good contact between tips and work.

The trigger 28 is held and the pilot light 60 remains dim while the work is heating. When the work is hot enough, the solder wire 26 automatically feeds out as it melts against the hot work. When the solder wire has fully advanced to the distance governed by the adjustment of the thumb nut 49, the contacts in the micro-switch 36 automatically open. This causes the electronic time delay circuit to prepare to cut off the heating current. Soon thereafter, when the pre-set delay time has expired, the current stops, and this fact is indicated by the pilot light 60, which changes from dim to bright. The operator may then release the trigger and remove the soldering gun from the work.

If the trigger is released before the solder wire has fully advanced, the solder feed stops and the current continues to flow for the same delay time as usual. If the trigger is released during the delay time, after the solder wire has fully advanced, the soldering operation is quite normal. The micro-switch is already open and therefore release of the trigger has no electrical effect. If the delay time is too long, the gun may be removed from the work before the current stops, as indicated by a brightening of the pilot light 60. Merely releasing the trigger will not instantly cut off the current. Normally the delay time is not a critical variable and the operator removes the gun immediately in response to the light signal. As the current stops automatically when the work is done, time is wasted but no other harm is done when the light signal is not obeyed promptly.

If the solder wire melts back from the tips, due to overheating, it should be advanced to the tips by a partial stroke of the trigger. This avoids a deficiency in solder on the next operation. If the solder wire sticks to the work, it may be released by either cutting or melting. Melting is accomplished by switching to "manual" control and applying the tips to the work or nearby metal.

*Manual operation*

When the automatic-manual switch 77 is in the "manual" (closed) position, the automatic timing control is disabled or rendered inoperative. Current flows and heating continues as long as the soldering tips 23 contact the work. The trigger only feeds solder to the work. The quantity of solder is unlimited and depends only upon the number of successive full or partial strokes of the trigger which the operator may choose to make. Since both time and quantity of solder are subject to the discretion of the operator, as with conventional soldering tools, manual operation is advantageous chiefly when the proper delay time and the proper quantity of solder are unknown, as in non-repetitive work.

During "manual" operation, the pilot light 60 dims when the heat is on, which corresponds to good contact between tips and work, and has no relation to trigger motion, past or present. Thus the pilot light has no timing significance, but serves only to indicate, by remaining dim, that good contact is being maintained.

We claim:

1. In a soldering gun having a body, a feed mechanism for solder wire, comprising telescoped piston and cylinder members arranged on said body for reciprocable and rectilinear movement, as well as relative movement to each other, in the direction of solder wire feed, a return spring yieldingly holding one of said members in a retracted position, a feed spring operatively arranged between said members and urging the other of said members in said direction relative to said one member, a first one-way spring clamp on said other member and engaging the solder wire and operative to prevent rearward movement of the solder wire relative to said other member, a second one-way spring clamp on said body and engaging the solder wire and operative to prevent rearward movement of the solder wire relative to said body, and a trigger on said body and connected to said one member and so arranged that when said trigger is pulled said one member is advanced in said direction against the urging of said return spring whereby the solder wire is spring loaded by compression of said feed spring.

2. In a soldering gun having a body, a feed mechanism for solder wire, comprising telescoped piston and cylinder members arranged on said body for reciprocable and rectilinear movement, as well as relative movement to each other, in the direction of solder wire feed, a return spring yieldingly holding one of said members in a retracted position, a feed spring operatively arranged between said members and urging the other of said members in said direction relative to said one member, a first one-way spring clamp on said other member and engaging the solder wire and operative to prevent rearward movement of the solder wire relative to said other member, a second one-way spring clamp on said body and engaging the solder wire and operative to prevent rearward movement of the solder wire relative to said body, a trigger on said body and connected to said one member and so arranged that when said trigger is pulled said one member is advanced in said direction against the urging of said return spring whereby the solder wire is spring loaded by compression of said feed spring, and means for adjustably limiting the advance movement of said one member whereby a selective predetermined length of solder wire may be fed.

3. In a soldering gun having a body, a feed mechanism for solder wire, comprising a cylinder member arranged for reciprocable and rectilinear movement on said body and with the axis of its bore parallel to the direction of solder wire feed, a piston member slidably arranged in said bore, a feed spring operatively arranged between said members and urging separation therebetween, means limiting the extent of separation of said members, a return spring connected to said cylinder member and body and yieldingly holding said cylinder member in a retracted position against said body, an externally threaded stem projecting rearwardly from said cylinder member through said body to the exterior thereof, a thumb nut arranged on the exposed portion of said stem and adapted to abut said body when said cylinder member is moved forwardly, said body, piston member and stem having alined passages through which the solder wire extends, a first one-way spring clamp on said piston member and engaging the solder wire and operative to prevent rearward movement of the solder wire relative to said piston member, a second one-way spring clamp on said body and engaging the solder wire and operative to prevent rearward movement of the solder wire relative to said body, and a trigger on said body and connected to said cylinder member and operative when pulled to move said cylinder member forwardly against the urging of said return spring whereby the solder wire is spring loaded by compression of said feed spring and remains so spring loaded until forward movement of said piston member is stopped by said limit means.

4. In a resistance type soldering gun having a pair of spaced soldering tips, the combination therewith of means for feeding a predetermined length of solder wire between said tips including a pair of spring separated movable members, means for clamping the solder wire to one of said members and a trigger connected to the other of said members so that when pulled the solder wire is spring loaded, and an electrical circuit under control of a switch for energizing said tips, said switch being arranged on one of said members and actuable by the other of said members so as to operate said switch for energizing said tips when the solder wire is spring loaded.

5. In a resistance type soldering gun having a pair of spaced soldering tips, the combination therewith of means for feeding a predetermined length of solder wire between said tips including a pair of spring separated movable members, means for clamping the solder wire to one of said members and a trigger connected to the other of said members so that when pulled the solder wire is spring loaded, and electrical means for energizing said tips including a control switch and a time delay circuit, said switch being arranged on one of said members and actuable by the other of said members so as to operate said switch for energizing said tips when the solder wire is spring loaded and said time delay circuit being operative to maintain said tips energized for a predetermined delay time after said switch is inactivated.

6. In a resistance type soldering gun having a pair of spaced soldering tips, the combination therewith of means for feeding a predetermined length of solder wire between said tips including a pair of spring separated movable members, means for clamping the solder wire to one of said members and a trigger connected to the other of said members so that when pulled the solder wire is spring loaded, a switch device carried by one of said members and having normally open contacts adapted to be closed by a plunger, the other of said members having a cam surface engaging said plunger and so formed as to operate said plunger to close said contacts only when said solder wire is spring loaded, and an electrical circuit under control of said switch for energizing said tips.

7. In a resistance type soldering gun having a pair of spaced soldering tips, the combination therewith of means for feeding a predetermined length of solder wire between said tips including a pair of spring separated movable members, means for clamping the solder wire to one of said members and a trigger connected to the other of said members so that when pulled the solder wire is spring loaded, a switch device carried by one of said members and having normally open contacts adapted to be closed by a plunger, the other of said members having a cam surface engaging said plunger and so formed as to operate said plunger to close said contacts only when said solder wire is spring loaded, and electrical means under control of said switch for energizing said tips and including a time delay circuit for maintaining said tips energized for a predetermined delay time after said switch reopens.

8. In a resistance type soldering gun having a pair of spaced soldering tips, the combination therewith of means for feeding a predetermined length of solder wire between said tips including a pair of spring separated movable members, means for clamping the solder wire to one of said members and a trigger connected to the other of said members so that when pulled the solder wire is spring loaded, and an electronic control circuit for energizing said tips only during the time the solder wire is spring loaded and for a predetermined delay time thereafter, said circuit including a transformer having a primary winding associated with a power source and a secondary winding connected to said tips, a relay having normally open contacts in the primary circuit, a pentode-diode vacuum tube having a plate connected with the relay winding, a time delay circuit associated with the diode part of said tube and including a condenser and resistor, said diode part serving as a half wave rectifier to charge said condenser, means for applying negative voltage from said condenser to the control grid of the pentode part of said tube and means including a normally open switch for short circuiting said condenser, said switch being arranged on one of said members and actuatable by the other of said members and adapted to be closed during relative movement therebetween.

9. The combination as set forth in claim 8 wherein said resistor is variable so that the time to charge said condenser can be selectively controlled.

10. The combination as set forth in claim 8 wherein said primary circuit includes a light connected in parallel therewith on the power source side of said relay, whereby said light dims during flow of current through said primary winding.

11. The combination as set forth in claim 8 wherein said primary circuit includes a pair of resistors in series, and a switch shunted across one of said pair of resistors, whereby the primary current can be selectively controlled for high or low heat.

12. The combination as set forth in claim 8 wherein said primary circuit includes a switch shunted across said relay contacts, whereby the automatic timing control can be rendered inoperative and primary current flows as long as said tips contact the work.

References Cited in the file of this patent

UNITED STATES PATENTS

| | | |
|---|---|---|
| 1,340,736 | Parsons et al. | May 18, 1920 |
| 1,749,684 | Wright | Mar. 4, 1930 |
| 2,228,291 | Weston | Jan. 14, 1941 |
| 2,251,557 | Weston | Aug. 5, 1941 |
| 2,438,525 | Walters | Mar. 30, 1948 |
| 2,604,571 | Naulty et al. | July 22, 1952 |
| 2,672,838 | Heidenreich et al. | Mar. 23, 1954 |